United States Patent
Chapman

(10) Patent No.: US 6,719,307 B1
(45) Date of Patent: Apr. 13, 2004

(54) SIDEBOARD SYSTEM FOR A CAMERA DOLLY

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 38 days.

(21) Appl. No.: 09/850,994

(22) Filed: May 8, 2001

Related U.S. Application Data

(63) Continuation-in-part of application No. 09/838,063, filed on Apr. 19, 2001, now abandoned.

(51) Int. Cl.$^7$ .................................................. B62B 11/00
(52) U.S. Cl. ..................... 280/47.34; 248/129; 396/428; 280/47.11
(58) Field of Search ............................... 248/129, 298.1, 248/223.41, 346.01, 346.3; 108/64, 65, 69, 90; 296/36; 280/47.11, 47.34, 651, 163, 164.1; 352/243; 396/428

(56) References Cited

U.S. PATENT DOCUMENTS

| | | | | |
|---|---|---|---|---|
| 2,447,667 A | * | 8/1948 | Raby | 248/129 |
| 2,553,082 A | * | 5/1951 | Conner | 108/64 |
| 2,725,783 A | * | 12/1955 | Jackson | 352/243 |
| 2,932,478 A | * | 4/1960 | Krieger | 248/129 |
| 2,955,888 A | * | 10/1960 | Graves | 108/69 |
| 3,613,546 A | * | 10/1971 | Richardson | 396/428 |
| 3,837,297 A | * | 9/1974 | Kaplan | 108/69 |
| 4,041,716 A | * | 8/1977 | Thompson | 405/219 |
| 4,278,284 A | * | 7/1981 | Ohlson | 296/36 |
| 4,909,700 A | * | 3/1990 | Fontecchio et al. | 280/163 X |
| 5,174,593 A | * | 12/1992 | Chapman | 280/47.11 |
| 5,318,313 A | * | 6/1994 | Chapman | 280/47.11 |
| 5,648,691 A | | 7/1997 | Takei | |
| 5,671,932 A | * | 9/1997 | Chapman | 280/47.11 |
| 5,789,892 A | | 8/1998 | Takei | |
| 5,806,865 A | * | 9/1998 | Chapman | 280/47.11 |
| 5,853,153 A | * | 12/1998 | Condrey | 248/125.2 |
| 5,924,827 A | | 7/1999 | Mora et al. | |
| 6,053,476 A | * | 4/2000 | Chapman | 254/8 R |
| 6,109,626 A | * | 8/2000 | Chapman | 280/47.11 |
| 6,112,486 A | * | 9/2000 | Ashton et al. | 52/291 |

OTHER PUBLICATIONS

U.S. Patent application Publication 2002/0030149—dated 3/2002.*
Chapman Pedolly Sideboard Brochure dated 1997.*

* cited by examiner

*Primary Examiner*—Bryan Fischmann
(74) *Attorney, Agent, or Firm*—Perkins Coie LLP

(57) ABSTRACT

A sideboard assembly for a camera dolly includes a base attached to the dolly chassis via threaded posts. A platform is slidably attached to the base. A platform brake can be released to allow the platform to slide forward or back on the base, so that the platform is positioned as needed relative to the camera dolly. The platform brake is tightened or engaged to lock the platform into a desired position. An end board assembly can be slidably positioned on end posts threaded into the front end of the camera dolly, to provide increased positioning flexibility. A fixed tab and a pivot tab on the platform allow the platform to be flipped over, so that it can be used interchangeably on the left and right sides of the camera dolly.

19 Claims, 8 Drawing Sheets

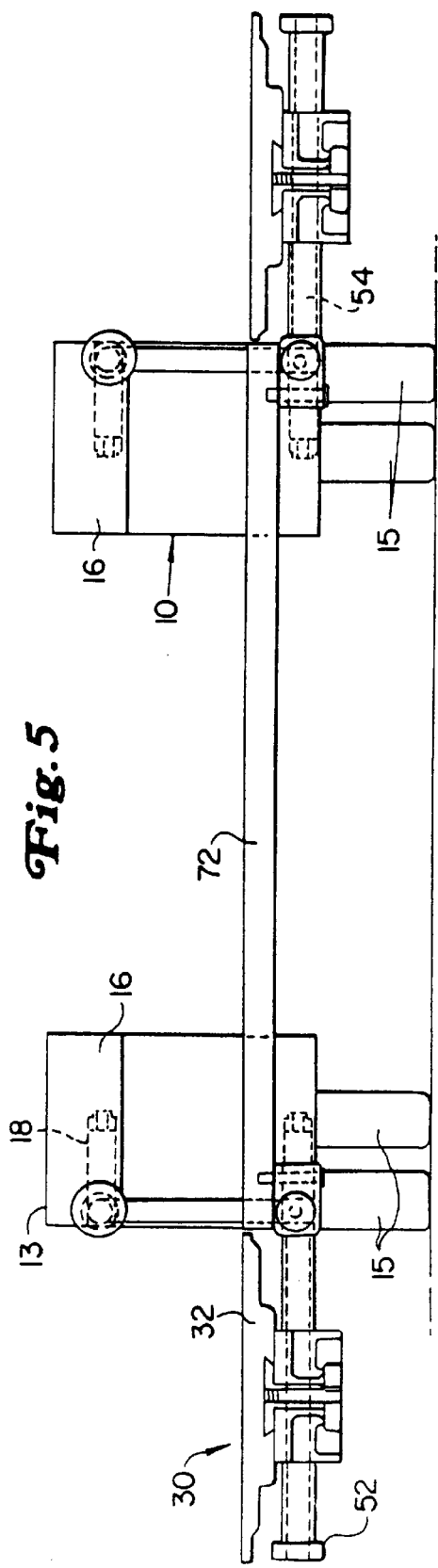
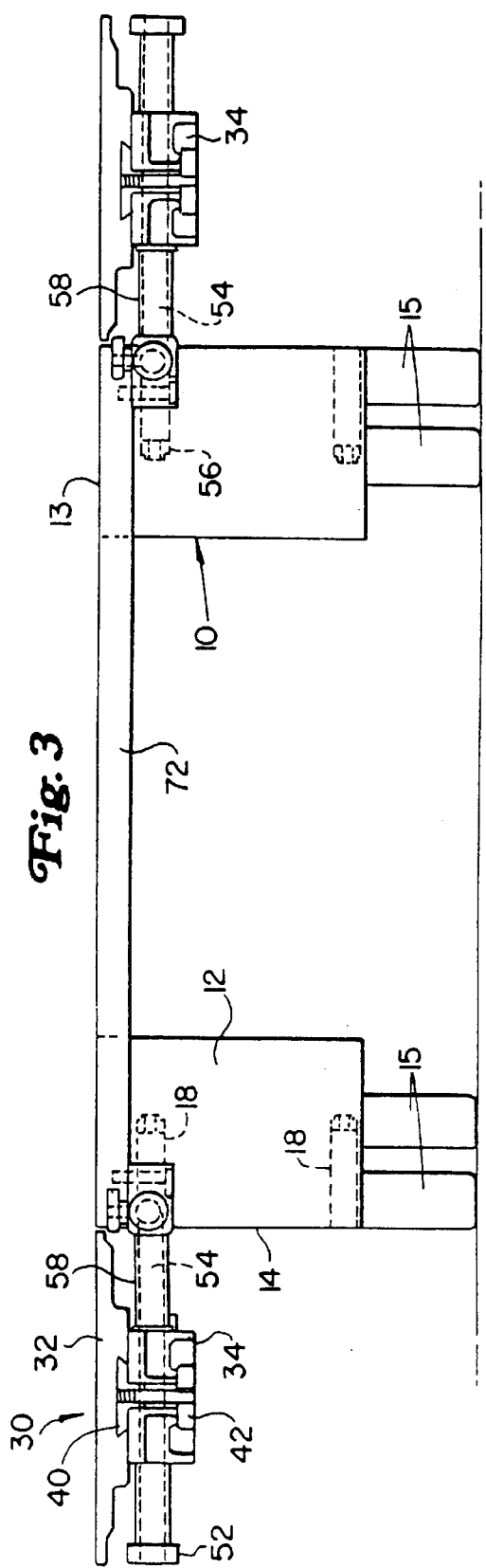

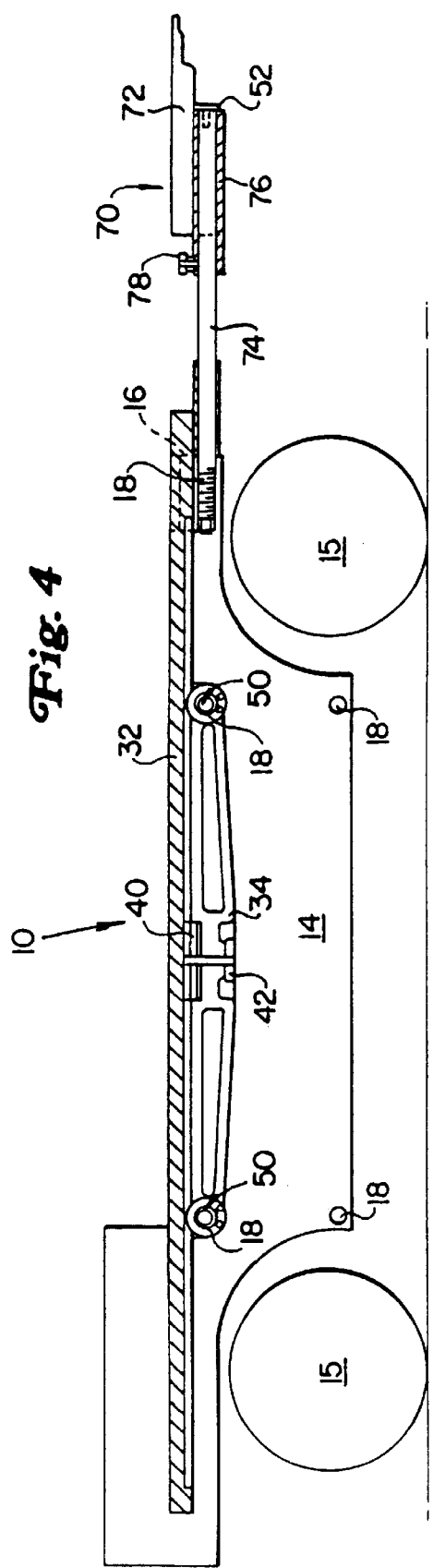
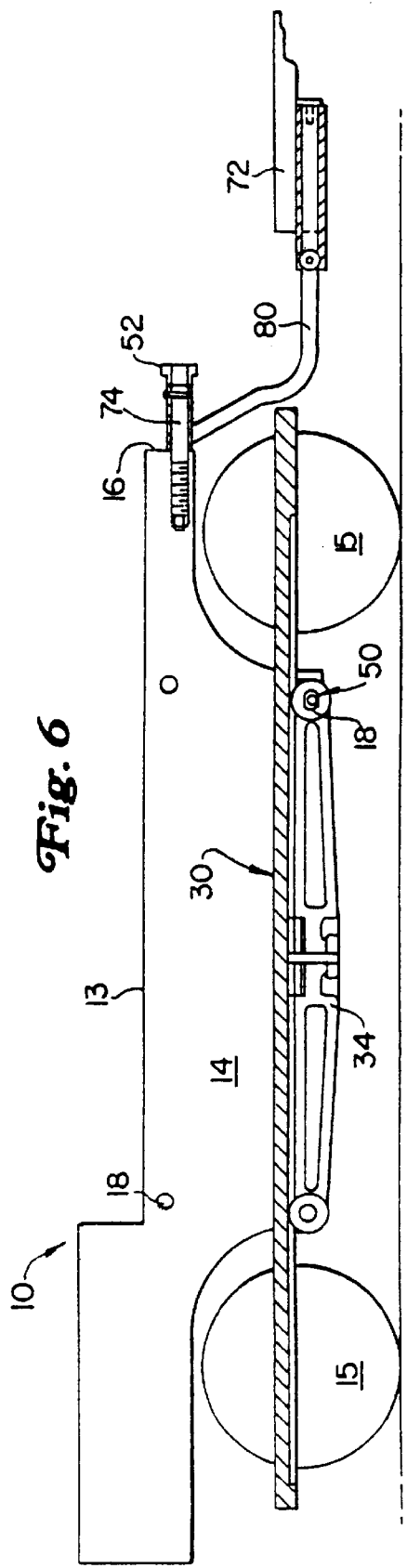

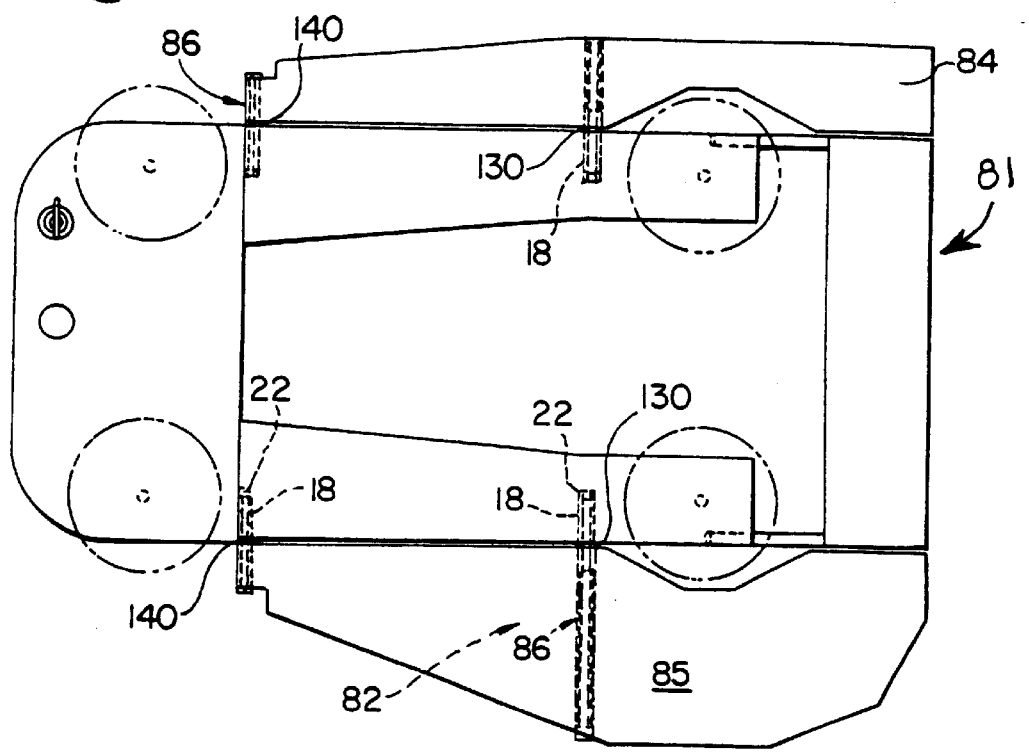
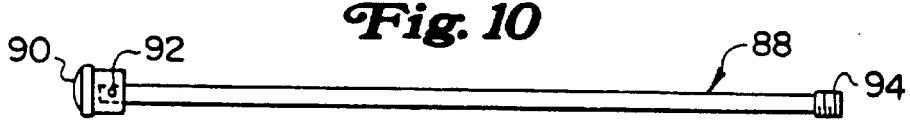
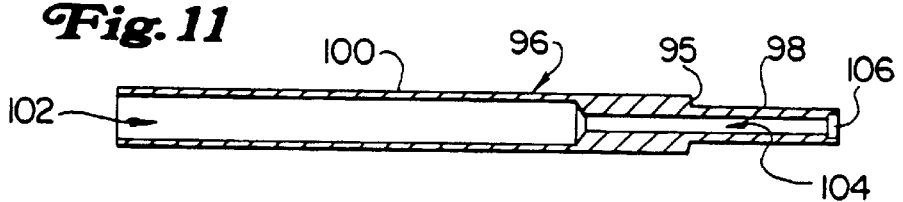
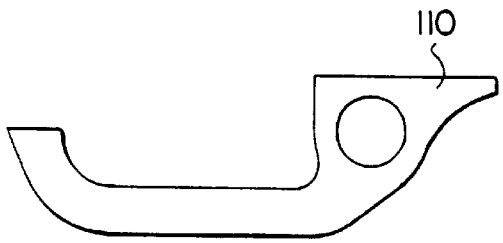

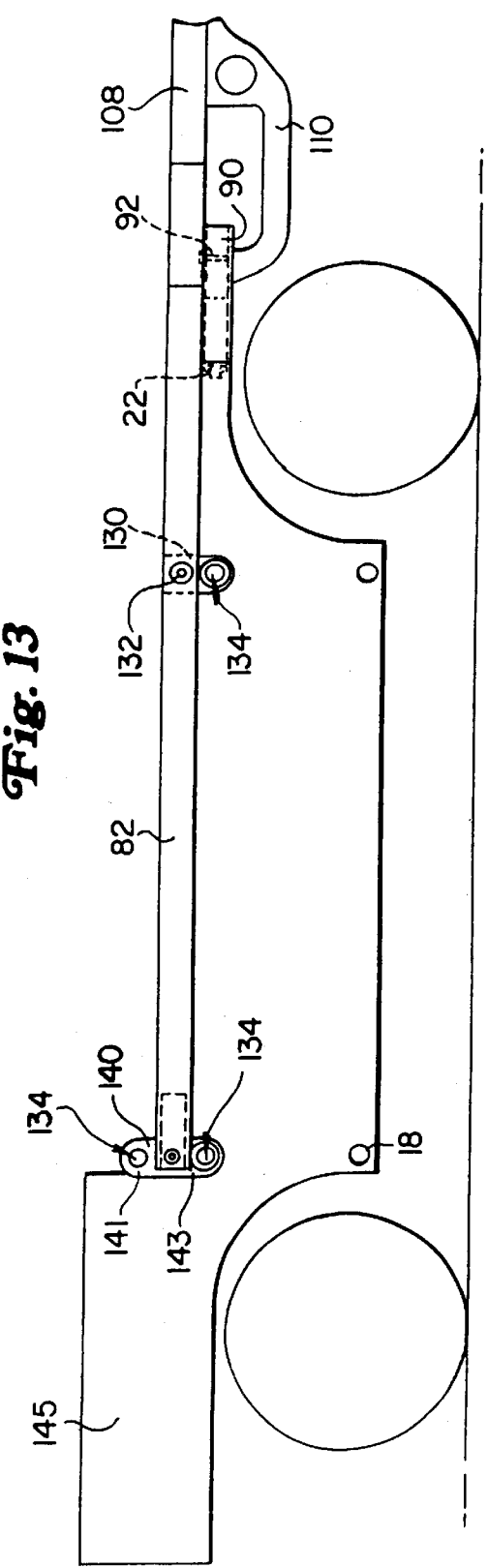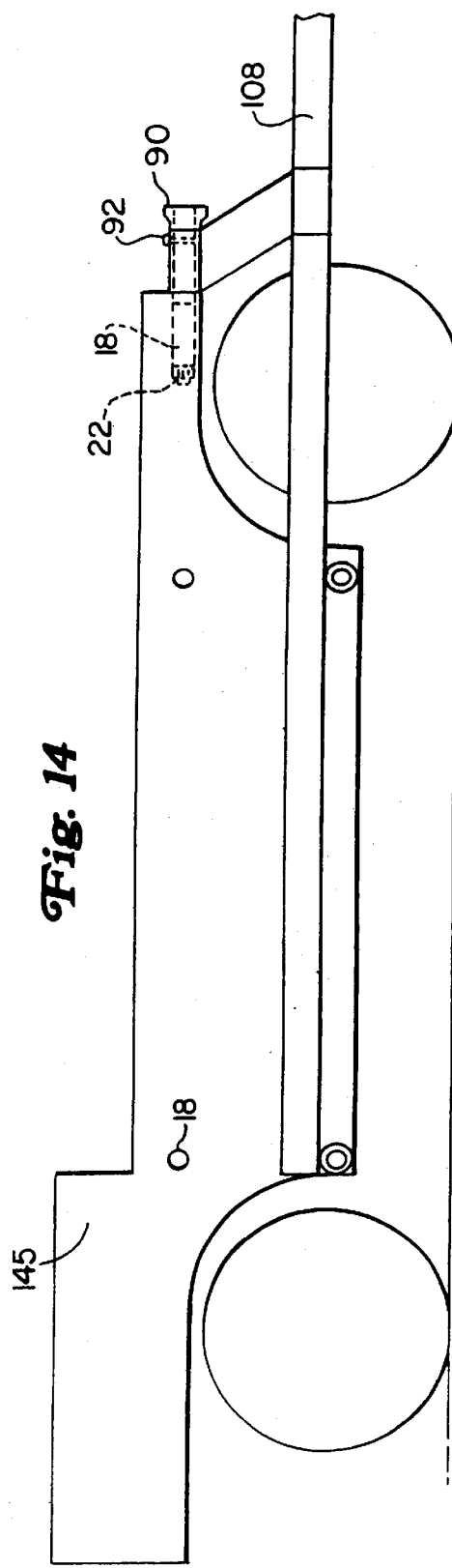

SIDEBOARD SYSTEM FOR A CAMERA DOLLY

This application is a Continuation-in-Part of Ser. No. 09/838,063 filed Apr. 19, 2001, and now abandoned, and incorporated herein by reference.

FIELD OF THE INVENTION

The field of the invention is camera dollies. More specifically, the invention relates to a sideboard system for use with a camera dolly.

BACKGROUND OF THE INVENTION

Camera dollies are used in the television and motion picture production industries to support and maneuver a camera. Typically, the camera dolly rolls on wheels, and has an arm to raise and lower the camera. The camera dolly is generally moved by dolly operators or dolly "grips," to properly position the camera, or to move the camera to follow a film or video sequence.

In addition to carrying the camera, the camera dolly will also often carry the camera operator standing on the camera chassis, behind the camera. One or more seats may also be installed on the camera dolly, on the chassis, or on the arm, to allow the camera operator to operate the camera from a seated position. Occasionally, the cinematographer, director, or other professional may also sit or stand on the camera dolly. Moreover, additional equipment, such as batteries, lens cases, counterweights, etc. may also be placed on the camera dolly.

Consequently, in many applications, there can be little or no unused space on the camera dolly. This can make it difficult for the camera operator, or others on the dolly, to move from one position to another, on the dolly, as needed to achieve a film sequence, or otherwise follow the actors or scene being filmed.

To provide more space on the camera dolly, removable sideboards, and front boards, have long been used as accessories. These sideboards or front boards typically have pins or posts which slide into openings on the dolly chassis. In effect, the sideboards extend the surface area of the chassis, to provide added space for people and equipment on the camera dolly. As the sideboards are removable, they are installed only when needed. This allows the camera dolly to otherwise remain more compact, so that it can be more easily maneuvered in tight locations, such as hallways, doorways, etc. In addition, the sideboards can be packaged and shipped separate from the camera dolly, making storage and transportation easier.

While various sideboards and front boards have been used on camera dollies in the past, certain disadvantages remain. Generally, sideboards are installed with pins or bars on the sideboards extending into clearance holes in the dolly chassis. While this design has met with varying degrees of success, it allows the sideboards to move or shift slightly. This may create unwanted noise or vibration, or allow inadvertent displacement of the sideboard away from the dolly chassis. In addition, existing sideboard systems have limited flexibility in how they can be attached and used on a camera dolly.

Accordingly, there is a need for an improved sideboard and front board system for a camera dolly.

SUMMARY OF THE INVENTION

In a first aspect, a sideboard assembly for a camera dolly includes a sideboard platform slidably attached to a base. The base is attached to the camera dolly with posts. A platform brake, clamp or similar device, can be released to allow the sideboard platform to slide on the base, and can be engaged to prevent such sliding movement. As the sideboard platform can be moved to various positions relative to the base and camera dolly, the added space or area provided by the sideboard platform can be located where needed. Accordingly, the sideboard assembly provides a versatile way to quickly and easily add payload space to a camera dolly.

In a second aspect of the invention, the sideboard platform has a dovetail slot in its bottom surface. A hand knob has a shaft extending through the base, and threaded into a dovetail tongue within the dovetail slot. Tightening the hand knob prevents relative movement of the sideboard platform relative to the base or camera dolly. The hand knob allows the sideboard platform to be quickly and easily secured into a desired position.

In a third aspect of the invention, the posts attaching the base to the camera dolly thread into threaded receptacles in the chassis of the camera dolly, to quickly and securely attach the sideboard assembly to the camera dolly.

In a fourth aspect of the invention, an end board assembly for a camera dolly includes an end board platform having spaced-apart collars. End posts are attached, preferably threaded into, receptacles in the camera dolly chassis. The end board platform can slide on the end posts, to adjust the end board platform position as desired. Brakes or clamps on the collars are used to lock the end board platform into position on the end posts. Consequently, the end board platform can be positioned next to, or spaced apart further from, the front end of the camera dolly.

In a fifth aspect of the invention, the end posts can be curved or angled, to provide an end board platform drop-down function, so that the end board platform can be positioned closer to the floor.

In a sixth aspect of the invention, a sideboard assembly has a securing rod having a threaded end extends through a bore in a sideboard post. The securing rod engages a threaded section of a receptacle in a dolly. As the sideboard post carries the weight of the sideboard assembly, the securing rod can be quickly and easily engaged and disengaged.

Other and further aspects and advantages will appear below. The invention resides as well in subcombinations of the components and steps described.

BRIEF DESCRIPTION OF THE DRAWINGS

In the drawings, wherein the same reference number indicates the same element, throughout the several views:

FIG. 3 is an end view, in part section, of the sideboard assemblies shown in FIG. 2.

FIG. 4 is a side elevation view, in part section, of the sideboard assembly and end board assembly as shown in FIG. 2.

FIG. 5 is an end view, in part section, of the sideboard assemblies shown in FIGS. 2 and 3, but installed at a lower position on the camera dolly.

FIG. 6 is a side elevation view, in part section, of the sideboards shown in FIG. 5, and also showing an end board in a drop-down position.

FIG. 8 is a schematic plan view of an alternative embodiment sideboard system.

FIG. 10 is a side view of the securing rod shown in FIG. 9.

FIG. 11 is a section view of the side post shown in FIG. 9.

FIG. 12 is a side view of the end bridge of an end board system.

FIG. 13 is a side view of the end bridge and the sideboards of FIG. 8 and 9 installed on a camera dolly.

FIG. 14 is an alternative end board system

DETAILED DESCRIPTION OF THE DRAWINGS

Figure 1:
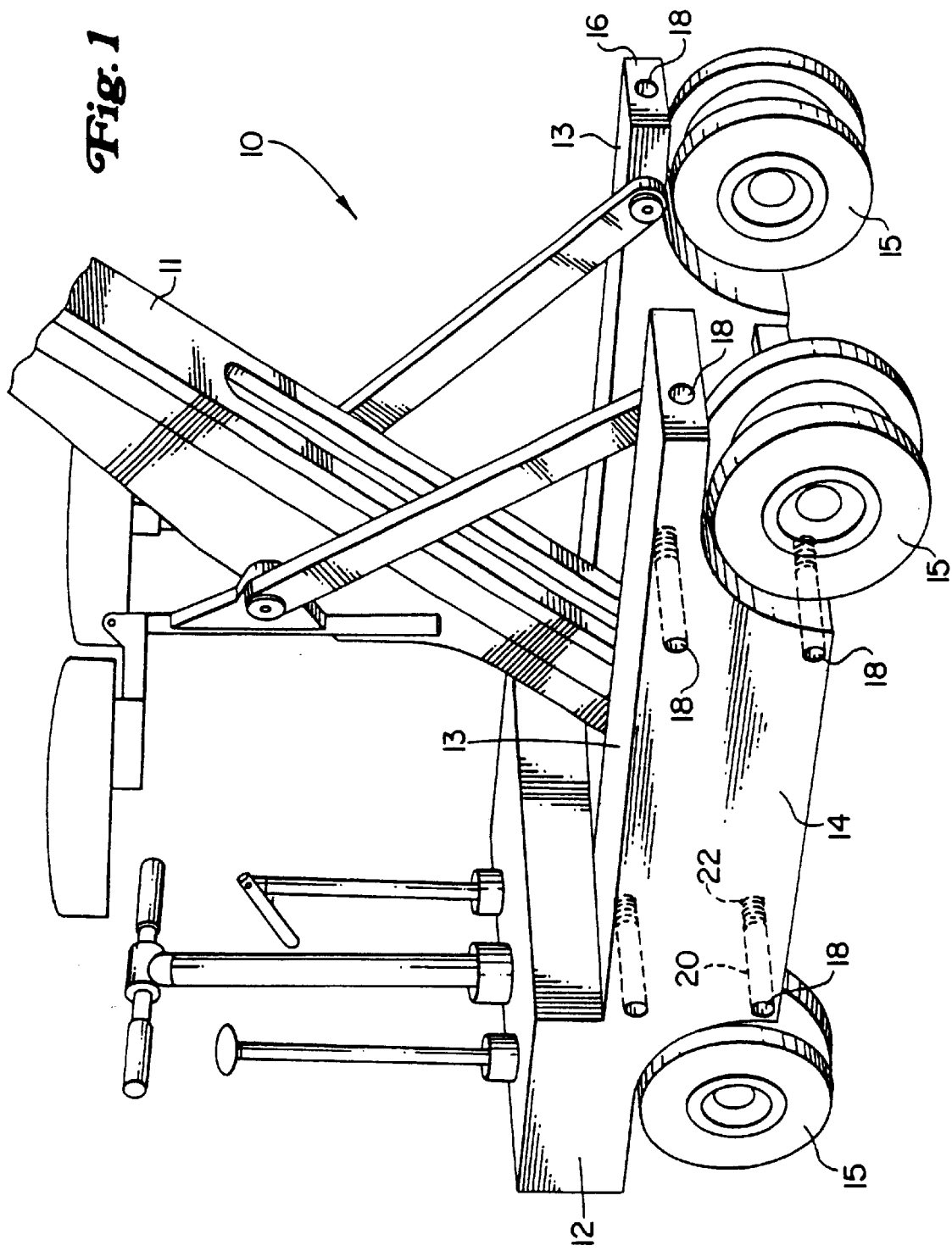
FIG. 1 is a perspective view of a camera dolly for use with the sideboard and end board assemblies of the invention.

Turning now in detail to the drawings, as shown in FIG. 1, a camera dolly 10 has a chassis 12 including a chassis side wall 14 and a chassis front wall 16. Receptacles 18 are provided in the chassis side wall 14 and the chassis front wall 16. Each of the receptacles 18 has a bore 20 leading into a threaded end 22.

Figure 2:
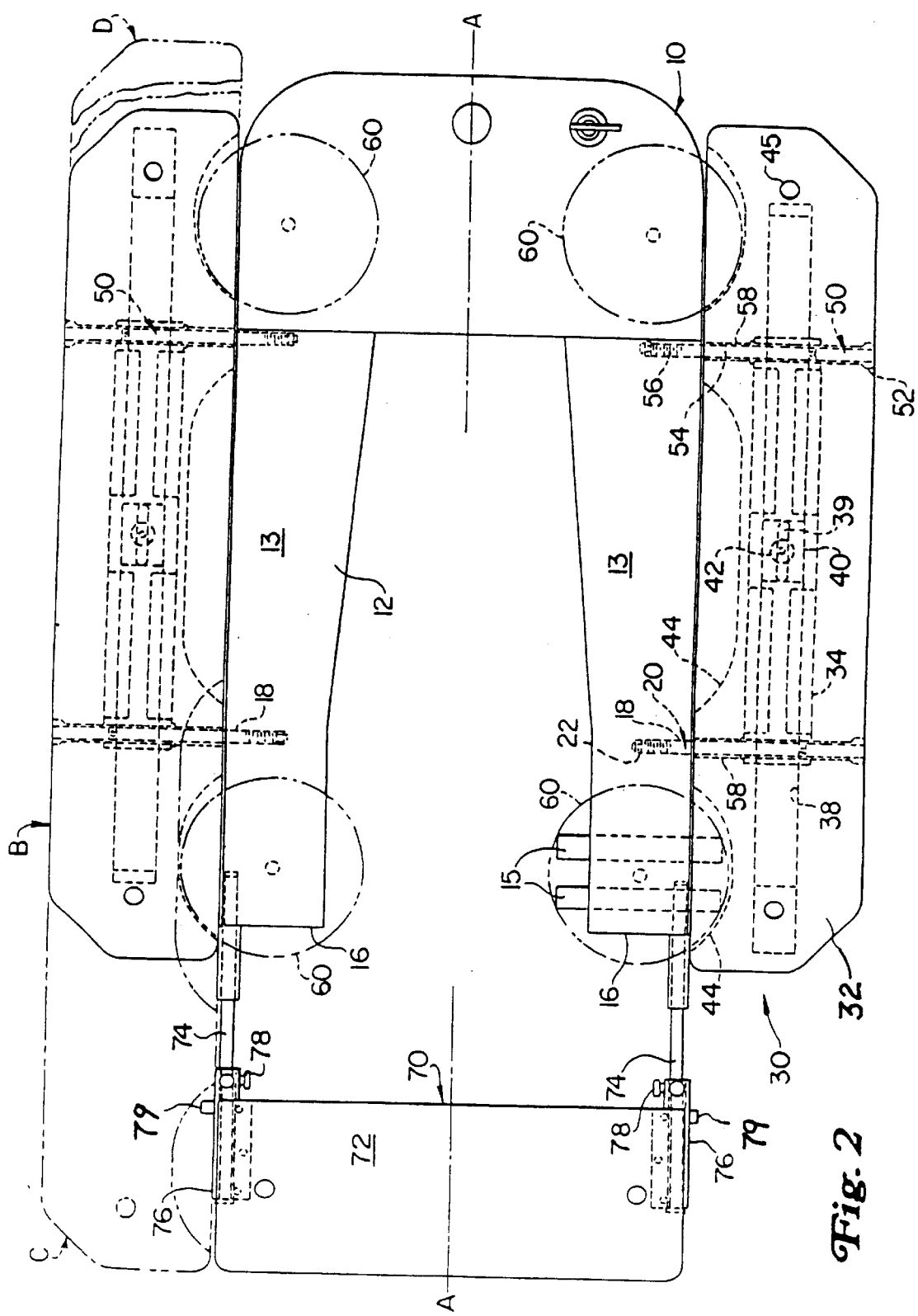
FIG. 2 is a top view of the camera dolly of FIG. 1, including the sideboard assemblies and end board assembly of the invention.

Turning to FIGS. 2, 3 and 4, a sideboard assembly 30 includes a sideboard base 34 which is attached to the chassis 12 of the camera dolly 10 via side posts 50. Preferably, the chassis side wall 14 includes two upper receptacles 18 adjacent to the top deck 13 of the camera dolly 10, as well as two lower receptacles, adjacent to the bottom of the chassis 12 of the camera dolly 10, and vertically aligned with the upper receptacles.

In the embodiment shown, two side posts 50 attach the sideboard base 34 to the camera dolly chassis 12. Each of the side posts 50 includes a shaft 54 having a handle 52 at the outer end of the shaft 54, and a threaded section 56 at the inner end. A spacer sleeve 58 is installed around the shaft 54, to maintain proper spacing between the sideboard base 34 and the chassis side wall 14.

A sideboard platform 32 is slidably attached to the sideboard base 34. Seat pockets 45 may be provided on the platform 32, so that the platform 32 can support seats, for use by a cameraman, cinematographer, director, etc. In the preferred embodiment, a dovetail groove or slot 38 is provided in the bottom surface of the sideboard platform 32. A dovetail tongue 40 is captured within the dovetail groove 38, and also within a short slot 39 in the upper surface of the sideboard base 34, as shown in FIG. 2. A locking knob 42 has a shaft extending through the short slot 39 in the base 34 and is threaded into the dovetail tongue 40. The dovetail tongue 40 has a tab 41 that fits into the slot 39 in the base 34, to prevent movement (other than slight vertical movement) of the dovetail tongue 40. The locking knob 42 is accessible by hand from underneath the base 34. With the locking knob 42 loosened, the sideboard platform 32 can slide longitudinally, parallel to the centerline A—A in FIG. 2, on the sideboard base 34. This allows the sideboard platform 32 to slide forward, from position B, to position C, where the sideboard extends beyond the front end of the dolly 10. Correspondingly, the sideboard platform 32 may also slide towards the back end, into position D in FIG. 2, or even beyond the back end, of the camera dolly 10. Preferably, the amount of sliding travel is about plus or minus 20 inches from the centered position, shown in solid lines in FIG. 2. The locking knob 42 acts as a brake, which can be released, to slide the platform into a desired position, and then tightened or engaged, to lock the platform in place. Various equivalent braking devices, such as clamps, pins, wedges, screws, Velcro tape, etc. can similarly be used for this purpose.

Depending upon the specific camera dolly used, and the dimensions of the sideboard platform 32, as well as the mounting geometry of the sideboard assembly 30 on the dolly 10, it may be necessary or advantageous to provide clearance in the sideboard platform 32, for the wheels 15 of the dolly 10. In most camera dollies, the wheels 15 can be steered to any steering angle. Consequently, as shown in FIG. 2, the dolly wheels 15 may extend outwardly significantly beyond the dolly chassis 12. The wheel clearance space or profile 60 is shown in dotted lines in FIG. 2. If necessary, to provide space for wheel clearance, wheel cutouts 44 can be provided along the inside edge of the sideboard platform 32. However, the cutouts 44 are optional.

Referring to FIGS. 2 and 4, an end board assembly 70 includes straight end posts 74, which are preferably threaded into receptacles 18 in the front end chassis wall 16. The end posts 74 extend through collars 76 on an end board platform 72. The end board platform 72 can slide on the posts 74. Locking knobs 78 on the collars 76 can be tightened to lock the platform 72 into position. FIGS. 2 and 4 show the platform 72 extended away from the front end wall 16 of the chassis 12. However, the platform 72 can also be moved closer into or adjacent to the chassis 12. Referring to FIG. 2, the end board platform 72 is optionally provided with end board clips 79. The end board clips attach the sideboard platform(s) 32 to the end board platform 72, to provide a more rigid structure of platforms around the dolly.

FIGS. 3 and 4 show the sideboard assemblies 30 and end board assembly 70 installed on the dolly 10 in a first or raised position, so that the sideboard platform 32 and end board platform 72 are generally flush with, or at the same level of, the top deck 13 of the chassis 12. For many applications, this raised position of the sideboard assemblies and/or end board assembly is preferred, as it, in effect, extends the area of the top deck 13.

Referring now to FIGS. 5 and 6, the sideboard assemblies 30 can also be installed at the lower level, to provide additional space at a low position along the sides of the dolly 10. With some camera dollies, such as the camera dolly 10 shown in FIG. 1, a lower set of receptacles 18 cannot be provided in the front end wall 16. For this type of camera dolly 10, the end board assembly 70 can be dropped down, to match the level of the sideboard assembly 30, shown in FIG. 6, by using drop-down end posts 80, in place of the straight end posts 74. As shown in FIG. 6, the drop-down end posts 80 are angled or curved, to position the end board platform 72 below the top deck 13. With this design, the handle 52 of the end post 74 is positioned adjacent to the attachment point at the chassis wall 16, rather than under the end board platform 72, as shown in FIG. 4.

In use, the sideboard assemblies 30 and end board assembly 70 are preferably provided as accessories. They may be stored and shipped in containers separate from the dolly 10, to reduce storage and shipping weights and container sizes. The dolly 10 may be used without these accessories. For applications where additional space on the camera dolly 10 is desired, one or both sideboard assemblies 30 are installed, optionally along with the end board assembly 70. Preferably, the sideboard assemblies 30 shown in FIG. 2 are identical, so that either sideboard assembly 30 can be installed on the left or right side of the camera dolly 10.

One or both sideboard assemblies 30 may be used. A sideboard assembly 30 is installed by moving the posts 50 into the receptacles 18. The handles 52 are then turned, so that the threaded ends 56 of the posts 50 engage into the threaded section 22 of the receptacles 18 within the chassis 12. The handles 52 are tightened to secure the sideboard assembly 30 in place. No tools are needed. Referring to FIG. 2, as the side posts 50 are tightened, the sideboard base 34 is drawn towards the chassis side wall 14. However, the sideboard base 34 bottoms out against the spacer sleeves 58, before the sideboard platform 32 contacts the chassis side wall 14. Consequently, when the side posts 50 are fully tightened, a small gap preferably remains between the platform 32 and the side wall 14. In an alternative design, the spacer sleeves may be omitted, allowing the sideboard platform to bottom out against the chassis side wall 14.

To shift the sideboard platform 32 longitudinally (i.e., parallel to the center line or axis A—A), the locking knob 42 underneath the base 34 is loosened, by hand. The platform 32 is then pushed or pulled by hand, either to the front or to the back, until it reaches the desired position. The locking knob 42 is then tightened, locking the platform 32 against any further movement. The sideboard platform 32 is then ready to hold other accessories, payload, or people. A similar procedure is used to install the sideboard assembly 30 into the lower position as shown in FIGS. 5 and 6. The sideboard assembly 30 may be removed by turning the handles 52 in the reverse direction, to disengage the threaded ends 56 of the side posts 50 from the receptacles 18.

The ability to position the platform 32 towards the front or back end of the camera dolly 10, provides several advantages. For example, for low camera angle filming sequences, where the arm 11 of the camera dolly 10 is at a very low position, and the camera is positioned far forward, it may be advantageous to also have one or two sideboard assemblies 30 positioned with the platforms 32 far forward, to provide additional standing or sitting space for the camera operator close to the camera. Alternatively, if the arm 11 of the camera dolly 10 is carrying a heavy payload, in a forward position, the center of gravity of the entire dolly 10 is shifted far forward. This type of loading makes the dolly 10 less stable, and potentially more difficult to steer and maneuver. Accordingly, the sideboard platforms 32 can be positioned to the rear, i.e., extending out beyond the back end of the dolly 10. Counterweights or other equipment placed on the platforms 32, can then act to counterbalance the payload on the arm 11.

The end board assembly 70 is similarly installed by engaging the end posts 74 into the threaded sections 22 of the receptacles 18 in the front end wall 16 of the chassis 12.

If the platforms 32 have wheel cut-outs 44, as shown in the embodiment in FIG. 2, the platform 32 must be positioned with the wheel cut-outs 44 aligned with the wheels 15. In the embodiment shown, due to the positioning of the wheel cut-outs 44, the sideboard platform 32 may be positioned either about 14 inches, or about 18 inches, forward, or backward, from the center position (shown in solid line in FIG. 2). If wheel cut-outs 44 are not needed, then the platform 32 can be positioned anywhere within its range of movement on the base 34, typically about plus or minus 20 inches from center. Referring to FIG. 3, the platform 32 is preferably milled from a one inch (2.5 cm) thick aluminum plate. The outer bottom areas are reduced in thickness, as shown, to reduce the weight of the platform.

Figure 7:
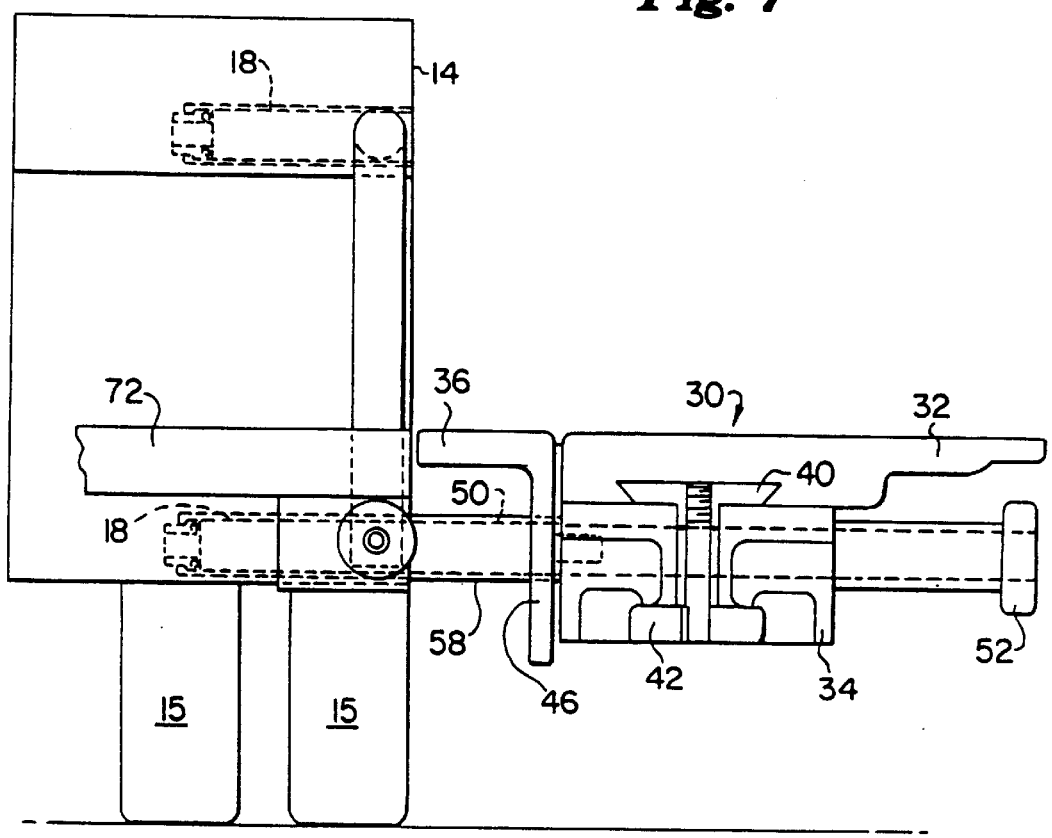
FIG. 7 is an end view, in part section, of an alternative sideboard assembly of FIGS. 8 and 9 installed on a camera dolly.

Referring to FIG. 7, in an alternative embodiment, a bridge plate 36 is provided between the sideboard assembly 30 and the dolly chassis 12. The side posts 50 extending through the base 34 also extend through a leg 46 of the bridge plate 36. An extended spacer sleeve 58 is provided over each of the side posts 50. However, the bridge plate 36 is shorter than the platform 32, and extends only in between the front and back wheels 15. Accordingly, the bridge plate 36 cannot interfere with the wheels 15. In addition, via the bridge plate 36, the platform 32 is spaced far enough out from the chassis 12, that sufficient clearance for the wheels 15 is provided, even without any wheel cut-outs 44. The bridge plate 36 is fixed to the base 34 and does not slide. It also acts as a linear guide for the platform 32, as the platform slides front or back on the base 34.

Turning to FIG. 8, in an alternate embodiment 81, a wide sideboard 82 is provided on one side of the dolly, and a narrow board 84 is provided on the other side of the dolly. This arrangement is useful in certain applications, for example for dolly movement which must be close to a wall or other confining feature. The narrow board 84 provides some added deck space, with minimal added width to the dolly. The sideboard 82 tapers towards the rear. This provides added deck space towards the front, where the camera is usually located, and where more deck space is typically needed. It also leaves more space towards the back, to avoid interfering with the dolly operators pushing and steering the dolly. Except for their dimensions and shape, the sideboards 82 and 84 are the same, for purposes of the following description. Thus, the following description of the wide sideboard 82 applies as well to the narrow (or other shape) sideboard 84.

Referring to FIG. 13, a pivot or moveable tab 130 having a post clearance hole 134 is pivotably attached at the inside edge of the platform 85 of the sideboard 82 via a pivot pin 132 or fastener. Pivotable here means moveable to up and down positions, and includes removable or detachable tabs which can be repositioned in an up or down position. This can be achieved via fasteners, pins, and other techniques. The pivot tab 130 can preferably pivot freely about the pin 132. The pivot tab 130 is advantageously attached generally at a midpoint or towards the front of the sideboard 82. A fixed tab 140 is preferably rigidly or irrotatably attached near the back end of the inside edge of the sideboard 82. The fixed tab 140 has two arms, one extending vertically above and one extending vertically below the sideboard 82. The pivoting tab has a single pivotable arm extending below the sideboard 82. The holes 134 are located on the tabs 130 and 140 so that the bottom surface of the platform is nominally positioned or resting on the side posts 96.

Figure 9:
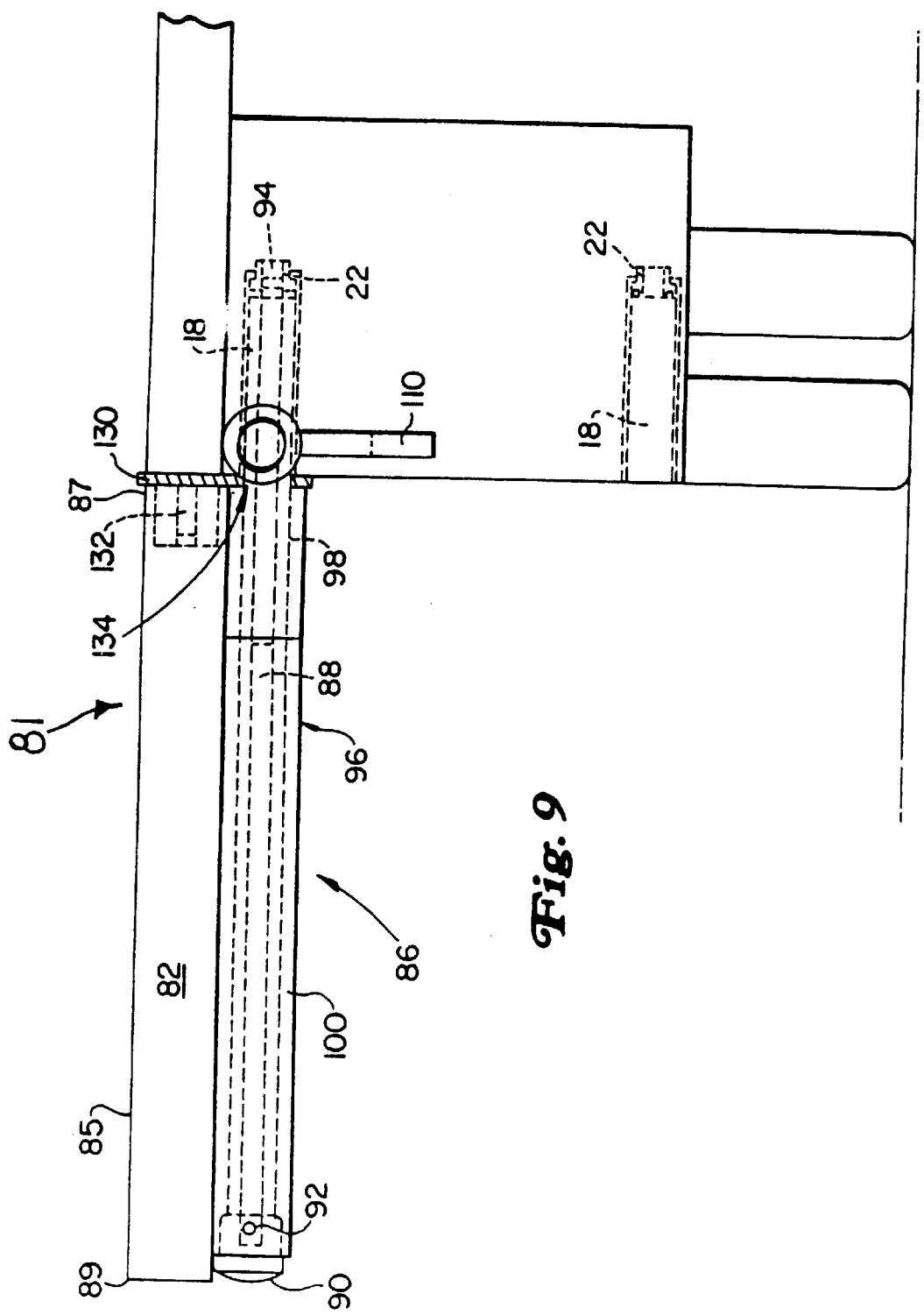
FIG. 9 is an end view, in part section, of the sideboard system shown in FIG. 8.

Referring to FIGS. 9–11, side post assemblies 86 are positioned underneath the platform 85 of the sideboard 82 and extend through the holes 134 in the tabs 130 and 140. Preferably two side post assemblies 86 are used. However, one side post assembly 86, or more than two side post assemblies and tab sets 130 and 140, may be desirable for some applications.

Referring still to FIGS. 9–11, each side post assembly 86 includes a securing rod 88 having a threaded inner end 94 and an end cap, knob, or handle 90 at an outer end. The end cap 90 is preferably attached to the rod 88 via a set screw 92, although other attachment techniques may also be used. The rod 88 extends through a side post 96. As shown in FIG. 11, the side post 96 has an inner section 98 attached or integral with an outer section 100. The outside diameter of the inner section is dimensioned to slide through the tab holes 134 and into the bore in the receptacle 18, i.e., the outside diameter of the inner section (e.g. ¾ inch) is nominally smaller (preferably 0.001–0.015 or 0.001–0.005 inches) less than the inside diameter of the bore in the receptacle 18. This allows the inner section to be readily aligned with and moved into the receptacle 18.

Referring still to FIG. 11, a cap bore 102 extends into the outer section 100 of the side post 96. A rod bore 104, having a smaller diameter than the cap bore 102, extends through the inner section 98, and joins with the cap bore 102. A counter bore 106 is provided at the end of the inner section 98. The major diameter of the threaded end 94 ( e.g., a ⅜ UNC thread) is larger than the diameter of the rod bore 104, so that the rod 88 cannot be pulled back out of the side post 96. The end cap 90 has a dimension or diameter greater than the diameter of the cap bore 102, so that the rod 88 cannot be pulled forward through the cap bore 102. Consequently, the rod 88 is captive within the side post 96. The rod 88 can rotate within the side post 96, and end can move axially forward and back by a small distance within the side post 96 (a distance sufficient for the threaded end 94 to engage into the threaded section 22 of the receptacle), but the rod cannot be removed from the side post 96. During manufacture, the rod 88 is installed into the side post 96, and then the end cap 90 is attached to the rod 88, permanently or otherwise, to complete the assembly 86 and to capture the rod 88 within the side post 96. The threaded end 94 can move into counter bore 106 when not in use, to help avoid damage to the threaded end during transport, handling or storage. The end cap diameter 90 is preferably smaller than the diameter of the outer section 100, so that the platform 85 rests flat against the outside section.

The side post assembly is preferably dimensioned so that when installed, as shown in FIG. 9, the end cap 90 is close to the outside edge of the platform 85, and does not extend beyond the outside edge of the platform. The narrow board 84 can use a similar side post assembly with a shorter rod 88 and a shorter side post 96, as needed. As shown in FIG. 8, the boards 82 and 84 may have side post assemblies 86 of different lengths, to match the width of the platform 85 at the location where the side post assembly is attached to the platform.

In use, the sideboard 82 is installed by sliding a side post assembly 86 through the clearance holes 134 in the tabs 130 and/or 140. Preferably the sideboard 82 has two tabs, 130 and 140, and two side post assemblies 86 are used. However, more than two may also be used. In addition, even a single tab and side post assembly 86 can be used, if an additional fastener, pin, clip or other device is used to maintain the board 82 in a level or other fixed orientation. The inner reduced diameter section 98 of the side post 96 slides through the tab hole 134. The step or shoulder 95 of the side post 96 rests against the side of the tab. On the fixed tab 140, the hole 134 in the bottom or lower arm 143 is used. The side post 96 is then engaged into the receptacle 18 by sliding the inner section 98 into the bore of the receptacle 18. After this step is completed, the weight of the sideboard 82 is supported on the dolly on the by side post 96. The sideboard 82 need no longer be lifted or held by the person installing the sideboard 82. This leaves both hands free. The sideboard 82 is then secured onto the dolly by turning the end cap 90. This turns the threaded end 94 into the threaded section 22 of the receptacle 18. The end cap 90 is drawn up against the outer section 100, pressing and holding the sideboard against the dolly. The sideboard 82 is then secured to the dolly and come off or separate from the dolly until the threaded end 94 is backed out from the threaded section 22. This provides a secure attachment of the sideboard to the dolly. As shown in FIG. 9, the side post assembly is perpendicular to the side wall of the dolly chassis.

Since the weight of the sideboard is supported at all times by the side post 96 in the receptacle 18, the rod 88 is always free to turn. The rod bears an axial or tensile load, when engaged into the threaded section 22, but it does not carry any shear or bending loads. This makes installation and removal of the sideboard fast and simple, even for one person. For sideboards having two or more side post assemblies 86, installation is also faster because after the sideboard is engaged to the dolly by placing the inner sections 98 into the receptacles 18, the installer can use both hands to engage and tighten the rods 88 simultaneously.

Referring now to FIGS. 12–14, the side post assembly 86 is also used on an end boards 108, with a shorter rod 88 and side post 96. This provides the advantages described above for the end boards as well. An end bridge 110 on an end board 108 may be used to attach the side post assembly 86 to the end board 108, as shown in FIG. 13.

With the sideboard 82 installed as shown in FIG. 13, the pivoting tab 130 extends below the sideboard 82 and the top deck of the dolly. Consequently, it does not create any obstacle to movement on the dolly (e.g., walking or standing), or to placement of accessories (e.g., batteries, lens cases, etc.) on the dolly. On the fixed tab 140, the upper arm 141 extends above the deck of the dolly and the sideboard 82. However, as the fixed tab 140 is preferably at the back 145 of the dolly, it typically is not in a location where it interferes with dolly use or operation.

Referring to FIGS. 13 and 14, at the inside edge 87 of the sideboard 82, adjacent to the dolly chassis, the sideboard 82 is secured against any movement by the side posts 96 passing through the holes 134 in the tabs 130 and 140. At the outside edge 89 of the sideboard 82, as shown in FIG. 9, the sideboard 82 simply rests on top of the side posts 96. Alternatively, tabs 130 or 140 may optionally also be provided at the outer edge 89, if desired, to attach the sideboard 82 to the posts 96 at the outer edge 89. However, as loading is virtually always in the down directly, outside tabs are ordinarily not needed. The fixed tab 140 prevents the sideboard 82 from parallelogramming or pivoting about the pin 132.

The sideboard 82 can be flipped over or inverted, and used on the other side (e.g., the left side, as viewed from the back in FIG. 8). The tab 130 pivots 1800, so that it continues to extend down below the platform 85. The lower arm 143 on the fixed tab 140 becomes the upper arm. Consequently, the board 82 can be used on either side of the dolly. It can also be similarly used in the lower sets of receptacles 18. The side post assemblies 86 can be separately used, without any sideboard 82, to carry or lift the dolly.

The tabs 140 and 130 can be removable or pivotable. If they are both pivotable, a pin, boss, fastener etc. may be used to prevent parallelogramming or inadvertent movement of the platform. Alternatively, the front/back positions of the tabs 140 and 130 can be switched. Both tabs may also be fixed or fixable onto the platform. The tabs may also be entirely omitted, with the platform supported vertically on the side posts and held onto the dolly via the securing rods.

Thus, a novel sideboard assembly, end board assembly, and camera dolly, have been shown and described. Various modifications and substitutions may of course be made without departing from the spirit and scope of the invention. The invention, therefore, should not be limited, except by the following claims, and their equivalents.

What is claimed is:

1. A sideboard system for a camera dolly, comprising:
a sideboard platform;
a side post assembly comprising:
a side post supporting the sideboard platform;
a securing rod extending through the side post, and rotatable and axially moveable within the side post, and with the securing rod having a threaded first end, and having a second end including an end cap;
wherein the side Post substantially supports the weight of the sideboard platform while the threaded end of the securing rod is threaded into the camera dolly.

2. The sideboard assembly of claim 1 with the side post including an inside section having a first outside diameter and an outside section having a second outside diameter, and with the first outside diameter less than the second outside diameter.

3. The side board system of claim 1 where the side post assembly extends substantially across the width of the sideboard platform when the sideboard platform is secured to the camera dolly.

4. The side board system of claim 1 where the screw threads on the securing rod have a diameter larger than the diameter of the securing rod.

5. The side board system of claim 2 where the inside section and the outside section of the side post are cylindrical and integrally formed together, and with a cap bore extending into the outside section and a rod bore extending through the inside section.

6. The side board system of claim 2 where the inside section has a diameter adapted to slide into a receptacle in a camera dolly chassis.

7. A sideboard system for a camera dolly, comprising:
a sideboard platform;
a first tab on the platform and having a post hole;
a second tab on the platform and having a post hole;
a first side post assembly including a first side post extending through the post hole in the first tab, and a first securing rod extending through the first side post, and rotatable and axially moveable within the first side post, and with the first securing rod having a threaded end and a first end cap; and
a second side post assembly including a second side post extending through the post hole in the second tab, and a second securing rod extending through the second side post, and rotatable and axially moveable within the second side post, and with the second securing rod having a threaded end and a second end cap.

8. The sideboard system of claim 7 where the second tab is fixed to the sideboard platform.

9. The sideboard system of claim 7 where the platform has top and bottom surfaces which are symmetrical.

10. The sideboard system of claim 7 where the platform has an inner edge and an outer edge, and where the first and second tabs are adjacent to the inner edge and are spaced apart from each other.

11. A method for providing a side board on a camera dolly, comprising the steps of:
aligning a first side post and a second side post of a side board with a first receptacle and a second receptacle, respectively, in a camera dolly;
sliding an inside section of the first side post and of the second side post into the first and second receptacles, respectively, so that the side board is supported on the camera dolly;
securing the sideboard to the camera dolly by threading first and second securing rods extending through the first and second side posts, into threaded ends in the first and second receptacles, respectively.

12. A method for providing a platform on a camera dolly, comprising the steps of:
extending a first post through a first tab on a platform;
extending a second post through a second tab on the platform;
positioning the first post into a first receptacle in a camera dolly; and
positioning the second post into a second receptacle in the camera dolly.

13. The method of claim 12 further comprising the step of securing the platform to the camera dolly by threading a first securing rod, extending through the first post, into the first receptacle and threading a second securing rod, extending through the second post, into the second receptacle.

14. A sideboard system for a camera dolly, comprising:
a sideboard platform;
a first tab fixed to the sideboard platform, and a second tab pivotally attached to the sideboard platform; and
a side post assembly supporting the sideboard platform, with the side post assembly comprising:
a side post; and
a securing rod extending through the side post, and rotatable and axially moveable within the side post, and with the securing rod having a threaded first end, and having a second end including an end cap.

15. A sideboard system for a camera dolly, comprising:
a sideboard platform;
a first tab pivotally attached to the platform and having a post hole;
a second tab on the platform and having a post hole;
a first side post assembly including a first side post extending through the post hole in the first tab, and a first securing rod extending through the first side post, and rotatable and axially moveable within the first side post, and with the first securing rod having a threaded end and a first end cap; and
a second side post assembly including a second side post extending through the post hole in the second tab, and a second securing rod extending through the second side post, and rotatable and axially moveable within the second side post, and with the second securing rod having a threaded end and a second end cap.

16. A sideboard system for a camera dolly, comprising:
a sideboard platform;
a first tab on the platform and having a post hole, wherein the first tab is moveable so that the post hole in the first tab can be positioned above the sideboard platform or below the sideboard platform;
a second tab on the platform and having a post hole;
a first side post assembly including a first side post extending through the post hole in the first tab, and a first securing rod extending through the first side post, and rotatable and axially moveable within the first side post, and with the first securing rod having a threaded end and a first end cap; and
a second side post assembly including a second side post extending through the post hole in the second tab, and a second securing rod extending through the second side post, and rotatable and axially moveable within the second side post, and with the second securing rod having a threaded end and a second end cap.

17. A sideboard system for a camera dolly, comprising:

a sideboard platform;

a first tab on the platform and having a post hole;

a second tab fixed to the platform and having a first arm with a post hole therein extending below the platform, and where the second tab further includes a second arm having a second post hole;

a first side post assembly including a first side post extending through the post hole in the first tab, and a first securing rod extending through the first side post, and rotatable and axially moveable within the first side post, and with the first securing rod having a threaded end and a first end cap; and a second side post assembly including a second side post extending through the post hole in the second tab, and a second securing rod extending through the second side post, and rotatable and axially moveable within the second side post, and with the second securing rod having a threaded end and a second end cap.

18. A sideboard system for a camera dolly, comprising:

a sideboard platform;

a first tab on the platform and having a post hole;

a second tab on the platform and having a post hole;

a first side post assembly including a first side post extending through the post hole in the first tab, and a first securing rod extending through the first side post, and rotatable and axially moveable within the first side post, and with the first securing rod having a threaded end and a first end cap; and a second side post assembly including a second side post extending through the post hole in the second tab, and a second securing rod extending through the second side post, and rotatable and axially moveable within the second side post, and with the second securing rod having a threaded end and a second end cap;

wherein the platform has a bottom surface which rests at least in part on at least one of the first and second side posts.

19. A sideboard system for a camera dolly, comprising:

a sideboard platform;

a side post assembly comprising:

a side post supporting the sideboard platform, the side post including an inside section having a first outside diameter and an outside section having a second outside diameter, and with the first outside diameter less than the second outside diameter;

a securing rod extending through the side post, and rotatable and axially moveable within the side post, and with the securing rod having a threaded first end, and having a second end including an end cap; and a counter bore at an inner end of the inside section, with the threaded first end moveable from a first position where the threaded first end is within the counter bore, to a second position, where the threaded first end extends out of the counter bore.

\* \* \* \* \*